Dec. 16, 1947.        W. P. LEAR        2,432,772
TELEMETRIC INDICATING SYSTEM
Original Filed Aug. 12, 1942
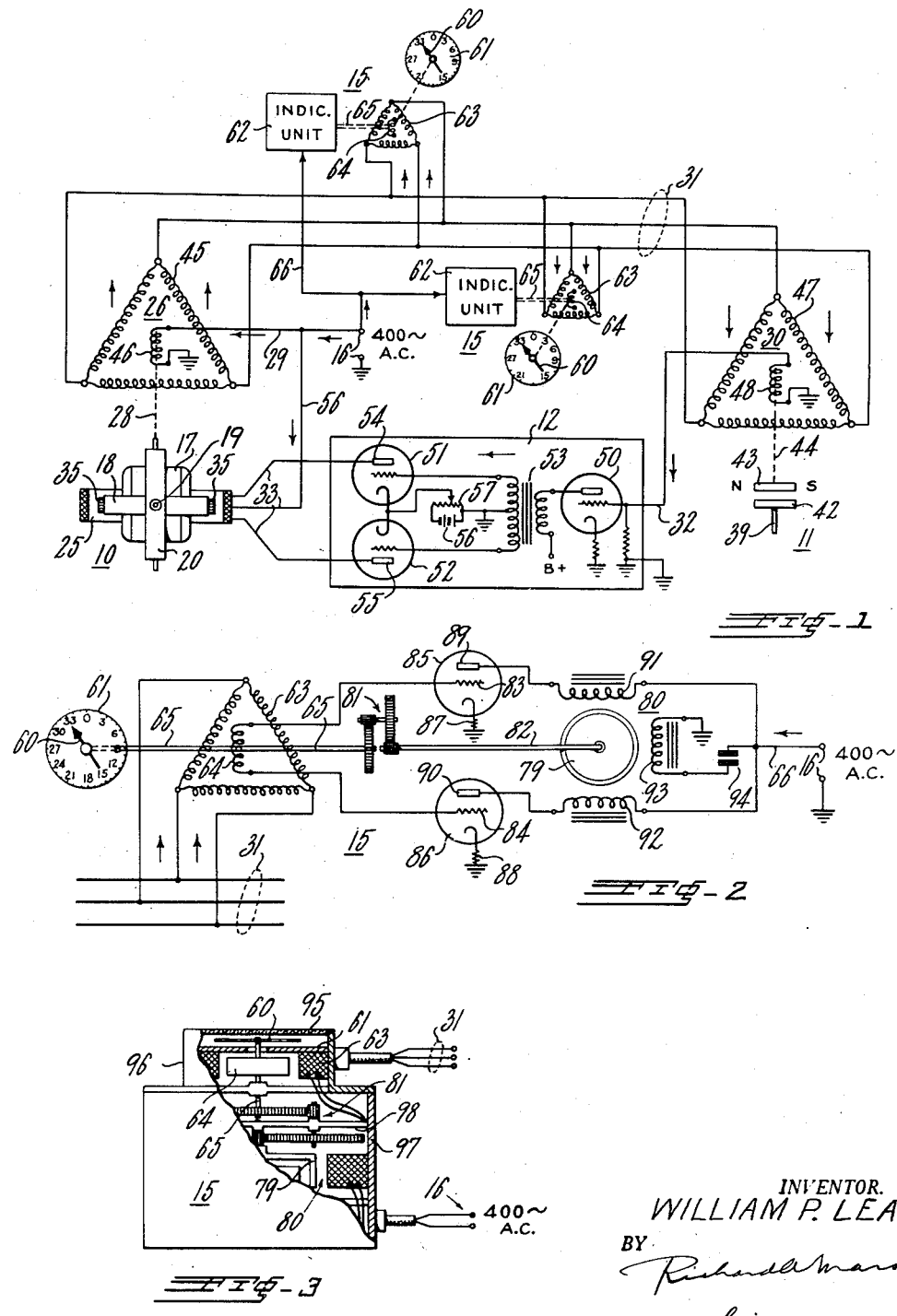
INVENTOR.
WILLIAM P. LEAR
BY
ATTORNEY Patented Dec. 16, 1947

2,432,772

UNITED STATES PATENT OFFICE 2,432,772

TELEMETRIC INDICATING SYSTEM

William P. Lear, North Hollywood, Calif., assignor, by mesne assignments, to Lear, Incorporated, Grand Rapids, Mich., a corporation of Illinois Original application August 12, 1942, Serial No. 454,559. Divided and this application January 15, 1944, Serial No. 518,467

2 Claims. (Cl. 177—351)

This invention relates to self-orienting remote indicators, particularly for use aboard aircraft to afford a plurality of remote indications of the readings of a master instrument. This application is a division of my copending application Serial No. 454,559, filed August 12, 1942 for "Compass control system," now Patent No. 2,403,091, dated July 2, 1946, and assigned to the same assignee as this case.

Large modern military aircraft generally require, throughout the aircraft, a number of remote indications of the readings of master instruments so that the co-pilot, navigator, bombardier and others thereon, may have continuous indication of various data necessary to the proper performance of their duties. Systems of the prior art provide only a limited number of remote indications. An important aspect of the system of my present invention is the provision of any number of remote indicators. These indicators are actuated by locally generated electronic control currents. They are self-aligning and correspond in position with the master instrument with which they are operatively associated. Remote indicators of the present invention are particularly useful in compass directional systems of the type including a magnetic compass and a directional gyroscope operatively coupled together. With the remote indicators of the present invention, continuous accurate indications of any given data are simultaneously provided throughout the aircraft, without loading or otherwise reflecting errors back on to the master instruments.

These and further advantages, objects and capabilities of my present invention will become more apparent in the following description of preferred embodiments thereof, shown in the accompanying drawings, in which:

Fig. 1 is a schematic electrical diagram of one embodiment which my invention may assume in practice.

Fig. 2 is a diagrammatic representation of the self-aligning remote indicator arrangement of the invention.

Fig. 3 is a view in elevation, partially in section, of one form which the remote indicator of the invention may assume in practice.

The remote indicators of the present invention are of general application and may be used in any system where a plurality of remote indications of the readings of one or more master instruments are required. For illustrative purposes, the indicators will be described as incorporated in the compass system of my above-identified patent. As shown in Fig. 1, such system includes a directional gyroscope 10, magnetic compass 11, intercoupled electronic directional control unit 12 and remote indicators 15, which latter are the subject matter of the present invention. The system is energized by a local alternating current source 16 that is aboard the aircraft. A 400 cycle supply is indicated. The directional gyroscope 10 is of the conventional type, comprising a rotor 17 mounted with three degrees of freedom. The gyroscope rotor 17 may be electrically or pneumatically driven, as will be understood by those skilled in the art. Gyro rotor 17 is spun about a horizontal spinning axis supported in gimbal ring 18, which in turn is freely mounted on bearings 19 in vertical ring 20. Vertical ring 20 is rotatably supported about a vertical axis on suitable bearings in the gyroscope.

Conventional auxiliary means for driving and caging the gyroscope, not shown, are to be understood as incorporated in the schematically represented directional gyroscope 10. Directional gyroscope 10 is of standard size and design, being additionally provided with a precession correction winding 25 mounted within the gyroscope. Winding 25 is concentric about horizontal gimbal ring 18. A bearing "pick-off" unit 26 is supported on a plate that is mounted on top of the gyroscope casing. Unit 26 comprises a central vertical shaft 28 which is secured to vertical ring 20 of the gyroscope. Practically no torque or force is imparted to the gyroscope by unit 26, as will hereinafter be set forth in more detail. The directional position of the gyroscope is in this manner directly communicated to pick-off unit 26. The practically torqueless or energyless pick-off of signal indications from master instruments is an important feature of the present invention, as this type of pick-off prevents loading errors of the remote indicators from being reflected back onto the master instrument. Thereby, the accuracy of indication of the master instrument is not impaired irrespective of how many remote indicators are electronically coupled therewith.

Unit 26 corresponds to a transmitter component of a self-synchronous type telemetering arrangement, and is energized by the local alternating current source 16 through lead 29 and the ground connection indicated. Pick-off unit 26 is interconnected through cable 31 with a corresponding pick-off unit 30 that is coupled to magnetic compass 11. A control signal is derived from the interaction of pick-off units 26 and 30. The control signal is introduced into the directional control unit 12 by lead 32 and common ground connection. A uni-directional control current is generated at the output of electronic unit 12, and conected by leads 33 to precession correction coil 25. A uni-directional corrective flux is produced by coil 25 that reacts with permanent magnets 35, 35 secured to horizontal gimbal ring 18. The corrective force thus exerted on magnets 35 is in a direction so as to counteract any precessional or turning errors that the gyroscope may tend to incur. In this manner the orientation and indications of the gyroscope are made stable, and "slaved" to the true magnetic north indications of magnetic compass 11.

The magnetic compass 11 may be of standard size and the conventional design generally used aboard an aircraft. As shown in Fig. 1 of my said patent, it is a master magnetic compass, containing a substantial magnetic bar which is mounted for free movement in azimuth for alignment with the earth's magnetic field. The directional orientations of the magnetic bar are communicated to the inductive electrical pick-off unit 30, as follows. A small magnet 42 is mounted at the upper end of spindle 39. A second magnet 43 is mounted above magnet element 42 and serves as a follow-up or "slave" magnet. Magnet 43 is connected to the rotor of pick-off unit 30 through shaft 44. Thus the azimuthal bearing indications of the main compass bar are faithfully communicated to the rotor of pick-off unit 30. Such action is with the application of negligible drag or torque which might interfere with accurate directional alignment of the compass magnet bar.

By my system, any number of remote bearing indicators 15 may be incorporated without introducing drag on either of the position determining units, in this case compasses 10 and 11, since the indicators are locally energized and self-aligning, as will be set forth in more detail hereinafter. The compass pick-off units 26 and 30 are such as are generally known and used in the art of telemetering such as "Selsyns." They comprise symmetrical rotor and stator components, interconnected so as to derive a stabilized electrical current and magnetic flux relationship therebetween. The stators are multi-phase wound, e. g. three-phase. The illustrated units 26, 30 have three-phase delta connected stator windings 45, 47 and single-phase rotor windings 46, 48.

Corresponding terminals of the three-phase stators 45 and 47 are interconnected by the three wire cable 31. The local alternating current supply 16, which in modern aircraft is usually at 400 cycles, is connected by lead 29 to the single phase rotor coil 46 of pick-off unit 26. As described above, rotor 46 is mechanically coupled to vertical ring 20 of gyroscope 10 through shaft 28. Rotor winding 48 of pick-off unit 30 is electrically connected by lead 32 to the input of electronic unit 12. Rotor 48 also is mechanically connected by shaft 44 to slave magnet 43 of the magnetic compass 11, as previously described.

The single-phase voltage applied to rotor 46 produces a sinusoidal magnetic field that induces voltages in the three-phase stator winding 45. The relative phase and magnitudes of the voltages induced in the three component branches of stator 45 depend upon the angular position of rotor 46 within the stator. Such angular position of rotor 46 is in turn controlled by the directional orientation of the gyroscope 10 through vertical ring 20. The induced voltages appearing at the terminals of stator 45 are transmitted to the corresponding terminals of stator 47 to produce currents in the windings of stator 47 that correspond with those in winding 45. A magnetic field is thereby set up within stator 47 that is identical in space and time phase relationship with the field within stator 45 as generated by rotor 46. The flux within stator 47 is sinusoidal in time. This flux induces a corresponding sinusoidal voltage in rotor winding 48 of unit 30.

The magnitude and phase of the voltage produced across coil 48 by stator 47 depend upon the angular space phase of coil 48 within stator 47. The induced voltage action is similar to that of a directional loop antenna responsive to a radio signal. The induced voltage is characterized by a figure-of-eight pick-up pattern. The phase of the resultant voltage in coil 48 is in-phase or 180° out-of-phase with the magnetic flux of stator 47. The magnitude of the voltage across rotor 48 is proportional to the sine of the angle which coil 48 makes with its zero pick-up position in the flux in stator 47. The rotor 48 induced voltage is impressed upon the control electrode of electronic amplifier tube 50 in unit 12. The voltage from rotor coil 48 constitutes a control signal for the system. The control signal is amplified in a conventional manner by triode 50, and impressed upon the control electrodes of a push-pull amplifier stage 51, 52 through transformer 53.

The control signal provided by the rotor 48 is of a magnitude that is directly dependent upon the angular difference that exists between bearings of the directional gyroscope 10 and magnetic compass 11, and of phase that is directly dependent upon the sense of the angular differences. The reason is that the space phase of the sinusoidally varying magnetic field within stator 47 depends upon the angular position of rotor coil 46 within its stator 45. The space phase of the flux within stator 47 is thus directly controlled by the angular bearing position in azimuth of directional gyroscope 10. On the other hand, the angular position of rotor coil 48 within stator 47 is determined by the angular bearing position of the magnet bar of the magnetic compass 11. Accordingly, the sinusoidal voltage impressed upon rotor coil 48 is determined by the spatial angular difference in azimuth existing between the two compasses 10, 11. The larger such angular difference, the greater the magnitude of the induced control voltage from coil 48 impressed upon electronic unit 12.

The control action is on the directional gyroscope 10 in a manner such as to bring it in line or tie in with the average magnetic compass north position. Such action is automatic and continuous in the system, and accordingly no substantial angular discrepancy can exist between the bearing indications of the compasses, nor pull apart the relative spatial positions of rotor coils 46 and 48 for a sufficient length of time to throw the system out of synchronism. For this reason also, the possible 180° pick-up ambiguity of the rotor coil 48 signal cannot in practice interfere with the determined sense relationship that controls the gyroscope precession correction action.

The control voltage at coil 48 will thus in practice be within a practical operating range of values, and its sense determines the direction of the precessional control on gyroscope 10 through coil 25 as follows. The control voltage introduced by lead 32 to electronic control unit 12 is impressed upon the grid electrodes of push-pull tubes 51, 52 in opposed or 180° out-of-phase relationship by push-pull transformer 53. Anodes 54, 55 of tubes 51, 52 are connected to alternating current source 16 by lead 56 through a center tap on precessional control coil 25. Thus the anodes of control tubes 51, 52 have the local reference alternating current voltage continuously impressed thereon in phase.

The control tubes accordingly selectively respond to the control voltage corresponding to the signal from rotor 46. The phase of the control voltage impressed on unit 12 determines which of control tubes 51, 52 is rendered conductive, as will now be understood by those skilled in the art. The in-phase and sinusoidal character of the anode voltage on tubes 51, 52 permits only one of them to conduct in correspondence with the phase of the control voltage applied to their grid electrodes. Thermionic tubes 51, 52 may be vacuum or of the gaseous variety, such as the so-called thyratron or trigger control tubes. The cathodes of the tubes 51, 52 are connected together and are suitably electrically biased by direct current voltage source 56.

A potentiometer 57 across bias voltage source 56 forms a sensitivity control for the precessional correcting action. Potentiometer 57 setting determines the relative magnitudes of the resultant uni-directional control current applied to coil 25, dependent upon the control signal magnitudes. The phase of the control signal voltage impressed upon the grid electrodes of either tube 51 or 52 is either in-phase or 180° out-of-phase with respect to the reference phase of the local A. C. 16 as applied to the anodes thereof. The control tube wherein both the impressed control voltage and anode voltage are in-phase render that tube conductive to produce a corresponding uni-directional current flowing through its associated section of the precession coil 25.

The direction of flow of the control current impressed upon either half of winding 25 is predetermined to react on permanent magnet elements 35, 35, and thus on gyroscope gimbal ring 18, in a manner to counteract or otherwise negative the bearing discrepancy which the gyroscope may tend to assume with respect to the magnetic compass. In other words, any angular discrepancy of the gyroscope which begins to arise due to northerly turning error, precessional error, or the like, causes an angular differential between rotors 46 and 48, which correspondingly produces the control signal at rotor 48 as previously set forth. The phase of the control signal is determined by the sense of such angular discrepancy, which phase is pre-related to the circuital connections of control tubes 51, 52 and the associated precession control coil 25, as well as the physical disposition of magnets 35, 35 on the gyroscope, in a manner to return the gyroscope orientation back to the angular position corresponding to the true magnetic north position of the magnetic compass. The sensitivity control of the precession action is adjustable by potentiometer 57, and in practice the overall action is determined by suitable physical design of the system components. It is thus unnecessary to periodically readjust the directional gyroscope 11 for precessional errors, since such are automatically eliminated by reference to and control by the average northerly readings of the magnetic compass 11.

The present invention relates to remote self-powered indicators with which sufficient control signal to operate the same is obtained from stator signals from the unit 26 coupled to directional gyroscope 10, or to any other master instrument. The particular source of the control signal may be the result of an automatically positioned gyroscope as illustrated in the present drawings, or any other displaceable device, or it may be a manual preset control mechanism.

The remote indicator units 15 are electrically connected to the compass system in a manner to avoid interference with the normal bearing indications of both compasses. Any number of remote indicator units 15 may be connected to the system, and all will read the stable bearing indication corresponding to that of the compass. The indicator needles 60 of all the indicator units 15 assume a spatial relationship corresponding to the spatial orientation of the magnetic compass 11 and the gyroscope 10 controlled thereby; the zero indices of the respective indicator cards 61 corresponding to the lubber lines of the compasses. Their readings are the angular deviation of the longitudinal aircraft axis with respect to the true magnetic north. Indicators 15 are self-orientating, deriving their energization from the local alternating current source 16. Each indicator unit 15 comprises an electronic motor driven component 62, and a stator-rotor unit 63, 64 coupled thereto by a shaft 65. The stator-rotor units 63, 64 of indicators 15 are similar in design with the corresponding telemetering stator-rotor units 26 and 30 coupled to compasses 10, 11. Three-phase delta wound stators 63 are connected to three-wire cable 31, in correspondence with the connections of the main stator units 26, 30. Control units 62 of indicators 15 are energized from local alternating current source 16, through lead 66, and ground.

The self-orienting remote indicator of the invention, schematicaly indicated at 15, is diagrammatically illustrated in Fig. 2. The unbalanced voltages produced by gyroscope pick-off unit 26 and introduced into three-wire cable 31, are correspondingly impressed upon the three-phase stators 63 of indicators 15 connected therewith. These voltages set up currents in the windings of stator 63, producing a magnetic flux condition within the stator. Such flux corresponds to that resulting in stator 47. The rotor 64 within stator 63 thus has a voltage induced therein of magnitude and phase corresponding to the angular position of rotor 64 with respect to that of gyroscope rotor unit 46. The reasons for this action are the same as hereinbefore described in connection with the signal voltage induced in rotor 48 by stator 47. The sense of the voltage induced in rotor 64 will accordingly be in-phase or 180° out-of-phase with respect to the local alternating current source 16, and of magnitude depending upon the "off-angular" position of the rotor coil 64. The true or "null" angular position of soil 64 will always correspond to the angular position of the directional compass bearings, at which position zero voltage is impressed upon the rotor 64.

Rotor 64 of remote indicator 15 is directly coupled by shaft 65 to indicator pointer 60. Shaft 65 is coupled to the rotor 79 of the control motor 80 by reduction gearing 81 through shaft 82. Indicator control motor 80 is shown of the split-phase or two-phase alternating current type, locally energized by alternating current source 16 and controlled by the voltage signal generated at rotor coil 64 as follows. The terminals of rotor coil 64 are respectively connected to control electrodes 83, 84 of a pair of thermionic tubes 85, 86. Tubes 85, 86 may be contained in a single envelope. The cathodes of tubes 85, 86 are connected to ground through biasing resistors 87, 88. Tubes 85, 86 may, for example, be biased for either class A or class B operation. The anodes 89, 90 of motor control tubes 85, 86 are connected to individual, oppositely phased, stator windings 91, 92 of motor 80. A third winding 93 of motor 80, arranged 90° out of space phase with the windings 91, 92, as in the usual design of a split-phase motor, is connected to the local alternating current source 16 through a substantial starting capacitor 94.

When pointer 60 is at its proper directional position, a zero signal voltage obtains across the terminals of rotor coils 64, and no current flows through tubes 85, 86 or motor stator windings 91, 92. Motor 80 is accordingly at rest and pointer 60 remains at its proper indicating position. When the angular attitude of the aircraft changes, this moves the casings of directional gyroscope 10 and magnetic compass 11 about their directionally stable elements, which produces a correspondingly changed bearing indication of the compasses with respect to their indices or lubber lines. Similarly, the rotors 46 and 48 being physically coupled to the spatially orientated compass elements 20 and 39, are rotated within their associated stator coils 45 and 47. This action causes a changed distribution in the unbalanced voltages within cable 31.

The voltage and magnetic flux redistribution occurs simultaneously at all the stator elements, including stators 45, 47, and stators 63 of each of the remote indicators 15. As this redistribution of the stator voltages and flux occurs, a corresponding voltage is set up within indicator rotor coils 64, the phase of which depends upon the sense of the angular change. The control electrodes 83, 84 of motor control tubes 85, 86 thus have a voltage applied that is pre-related to the fixed reference voltage on their anodes 89, 90 from the local A. C. source 16. This action causes a preponderance of alternating current at the local frequency in one of the two motor stator windings 91, 92. Rotor 79 of motor 80 is accordingly rotated in the direction to cause rotor coil 64 to follow the changing orientation of the stator 63 flux.

The direction of rotation of rotor coil 64 is such that it follows its zero voltage pick-up relation with the surrounding stator flux. Since pointer 60 is connected to rotor coil 64, it is correctly carried to the new angular position which the compasses 10, 11 assume with respect to the aircraft attitude. When a stable compass bearing position is reached, the zero voltage pick-up position prevails, and motor 80 promptly stops. The reduction gearing 81 facilitates precise stoppage, and inhibits hunting. A similar action prevails when a discrepancy arises or tends to arise between the bearing indications of the directional gyroscope 10 with respect to those of the magnetic compass. In the latter instance, the stator winding flux distribution is temporarily orientated to bring both compasses into correspondence, in the manner previously described, and the stator-rotor 63, 64 reaction thereto is the same. The remote indicator pointers 60 will accordingly always be oriented in the stable compass azimuthal bearing position with respect to their associated cards 61. The remote indicator unit 15 is fully energized from the local A. C. source, and does not produce a drag on the main compass units.

Fig. 3 is an elevational view, partly in section, of a physical form which self-orientating indicator 15 may assume. The indicator 15 shown in Fig. 3 incorporates all the components indicated in schematic diagram, Fig. 2. The pointer 60 and card 61 are at the top, and are viewed through transparent pane 95. The stator and rotor coils 63, 64 are arranged with the pointer 60 within a shoulder 96 extending from the indicator housing 97. Shaft 65 projects from rotor 64 into housing 97 and is coupled to reduction gearing 81. Reduction gearing 81 is supported on a shelf 98, and is shown connected to rotor 79 of motor 80. Rotor 79 is of the drag-cup type. Control tubes 85, 86, condenser 94, and the other electrical elements and connections of indicator 15 are also incorporated within the housing 97. The resultant arrangement is compact, light in weight, rugged, and fool-proof. Such self-orienting units may be used to readily provide compass indications and in any number of remote points aboard the aircraft.

Although I have described a preferred embodiment for carrying out the principles of my present invention, it is to be understood that modifications thereof may be made by those skilled in the art without departing from the broader spirit and scope of the invention as defined in the appended claims.

What is claimed is:

1. A remote indicator system comprising an indicator stator having a multiphase winding, a closed circuit including said stator and a multiphase wound controlling stator, an indicator rotor winding inductively coupled with said indicator stator, an index element, a common shaft for said rotor winding and element, a locally energized reversible electric motor having oppositely phased field windings and a rotor coupled with said shaft through reduction gearing, electronic means responsive to current induced in said indicator rotor winding for selectively energizing one of said field windings of said motor until said indicator rotor achieves electrical equilibrium with respect to its stator, said indicator stator being substantially ineffective to affect the distribution of voltages in the closed system by reflecting errors to said controlling stator.

2. A remote indicator system comprising an indicator stator having a multiphase winding, a closed circuit including said stator and a multiphase wound controlling stator, an indicator rotor winding inductively coupled with said indicator stator, an index element, a common shaft for said rotor winding and element, a locally energized reversible electric motor having a normally energized field winding, a pair of oppositely phased field windings, and a rotor coupled with said shaft through reduction gearing, electronic means responsive to current induced in said indicator rotor winding for selectively energizing one of said pair of field windings of said motor until said indicator rotor achieves electrical equilibrium with respect to its stator, said indicator stator being substantially ineffective to affect the distribution of voltages in the closed system by reflecting errors to said controlling stator.

WILLIAM P. LEAR.

REFERENCES CITED

The following references are of record in the file of this patent:

UNITED STATES PATENTS

| Number | Name | Date |
|---|---|---|
| 1,547,435 | Mittag | July 28, 1925 |
| 2,203,478 | Wills | June 4, 1940 |
| 2,331,934 | Satterlee | Oct. 19, 1943 |
| 1,743,794 | Murphy | Jan. 14, 1930 |
| 2,364,450 | Keeler | Dec. 5, 1944 |

FOREIGN PATENTS

| Number | Country | Date |
|---|---|---|
| 280,682 | Italy | Dec. 17, 1930 |

Certificate of Correction

Patent No. 2,432,772.                                                December 16, 1947.

WILLIAM P. LEAR

It is hereby certified that errors appear in the printed specification of the above numbered patent requiring correction as follows: Column 4, line 73, for "rotor 46" read *rotor 48*; column 6, line 51, for "soil 64" read *coil 64*; and that the said Letters Patent should be read with these corrections theerein that the same may conform to the record of the case in the Patent Office.

Signed and sealed this 6th day of April, A. D. 1948.

[SEAL]

THOMAS F. MURPHY,
*Assistant Commissioner of Patents.*